Feb. 11, 1947. A. F. HOLDEN 2,415,494
HOLLOW ELECTRODE FOR SALT BATH FURNACES
Filed Dec. 13, 1944
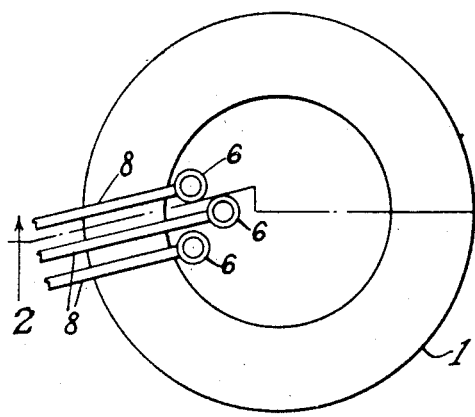
Fig. 1
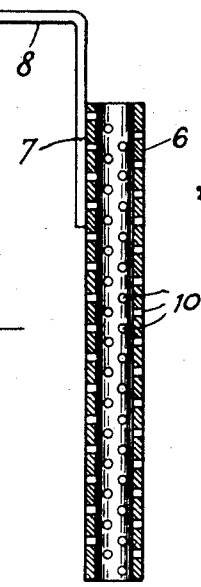
Fig. 3
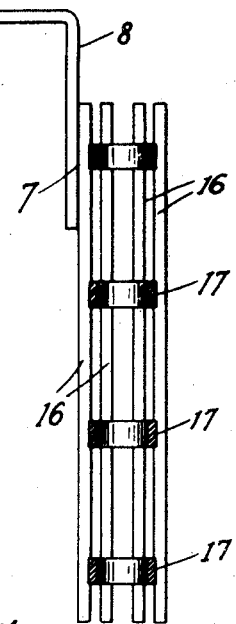
Fig. 5
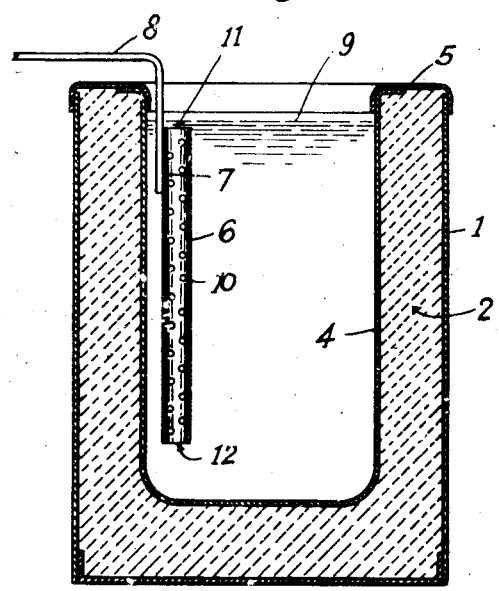
Fig. 2
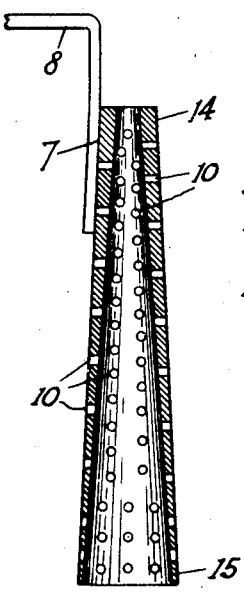
Fig. 4
Fig. 6
INVENTOR
Artemas F. Holden
BY
Ramsey Hurd + Childs
ATTORNEYS Patented Feb. 11, 1947

2,415,494

UNITED STATES PATENT OFFICE 2,415,494

HOLLOW ELECTRODE FOR SALT BATH FURNACES

Artemas F. Holden, New Haven, Conn.

Application December 13, 1944, Serial No. 568,037

5 Claims. (Cl. 13—23)

The present invention relates broadly to salt bath furnaces for heat treatment of metal parts and more especially to electrodes for use in resistance heated salt bath furnaces.

Electrodes heretofore used in the resistance type salt bath furnaces have comprised solid bars of metal that are conductors of electricity and which extend into the salt bath contained in a suitable pot whereby the passage of a current of electricity from the electrodes through the salt bath between the electrodes heats the salt bath to the desired temperature, which may range from 300° F. to 2400° F. These electrodes of the prior art have in most cases extended from above the surface of the melted salt down into the melted salt for a substantial distance in the pot.

The present invention comprises hollow tubular electrodes preferably perforated by a plurality of openings through the side walls of the hollow tubular electrodes. Preferably these hollow electrodes are totally submerged in the bath so that the melted salt of the bath completely covers the hollow electrodes. As the electrical current is applied to a plurality of such electrodes, the salt in the path of the current becomes heated and the lower part of the bath is usually hotter than the upper portion of the bath due partly to better heat insulation adjacent the bottom of the pot. The zone adjacent the electrodes is the highest heated zone of the bath, and due to this differential heat situation, the bath will circulate through and around the hollow electrodes, thereby providing a thermal flow to the liquid salt bath and thus more evenly heat the entire salt bath in the pot. In the preferred form of this invention with the electrodes having openings through the walls thereof, the liquid salt bath will flow through these openings and further contribute to the thermal flow of the melted liquid salts comprising the bath.

A further object of the present invention comprises the presentation of a substantially larger area for current flow by use of the hollow electrode, and especially where it is perforated in the wall, than is presented by the use of a solid electrode.

The drawing, comprising a portion of this specification, is diagrammatic except as to the illustration of the preferred form of the electrode, and it is to be understood that the disclosure herewith is to be considered as illustrative and not in a limiting sense.

Fig. 1 is a plan view of an electrical furnace illustrating electrodes in accordance with the present invention;

Fig. 2 is a sectional view taken on line 2—2 of Fig. 1;

Fig. 3 is a sectional view through the preferred form of electrode;

Fig. 4 is a sectional view through a tapered electrode, also having side walls of variable thickness;

Fig. 5 is a sectional view on line 5—5 of Fig. 6 of an electrode formed of rods secured to suitable supports; and Fig. 6 is a plan view of the electrode illustrated in Fig. 5.

The invention is illustrated in the drawing in Figs. 1, 2 and 3 as comprising a suitable shell 1 which encloses heat insulating material 2 that surrounds and supports a suitable salt pot 4, which may be made of any suitable material, but is illustrated in the drawing as a metal pot. An annulus-shaped member 5 covers the upper flanged end of the pot 4, the heat insulating material 2, and the shell 1. Electrodes 6 are preferably welded at 7 to suitable electrical conductors 8 which feed electrical current from a suitable source to the electrodes 6, and the conductors 8 also support these electrodes in the molten salt bath 9.

The electrodes 6 are hollow tubular members which in practice may vary from one inch overall diameter to three inches overall diameter and may have side walls of a thickness from ⅛" to ¾" thick, the preferred thickness being about ½". The length of the electrodes is dependent upon the depth of the pot 4. Preferably the side walls of these tubular electrodes are provided with openings which may comprise drill holes 10. Preferably the electrical supply members 8 are constructed to extend into the molten salt bath 9 to a depth which will submerge the upper ends 11 of the electrodes and without bringing the lower ends 12 of the electrodes into contact with the bottom of the pot 4.

When a furnace in accordance with the present invention is in operation and the salt bath 9 is thoroughly liquid, there will be a thermal flow of the salt bath due to the fact that the bath will be hottest adjacent the location of the electrodes. Since the electrodes are hollow, the liquid salt bath will flow into the interior of the electrodes and will flow through the openings 10 in the side walls of the electrodes. The added surface area of these hollow electrodes substantially increases the efficiency of their operation.

Referring now to the form of electrode illustrated in Fig. 4, the side walls are shown as being thick at the top 14 and thinner at the bottom 15.

This provides more metal adjacent the top where the electrodes usually fail, and the increase in diameter at the bottom 15 over the top 14 provides greater surface area at the bottom to contribute to greater current flow in the deep salts adjacent the bottom of the pot and thus further contributes to thermal flow of the liquid salt bath in the pot.

Figs. 5 and 6 illustrate a form of hollow electrode made from rods 16 mounted upon suitable supports, such as rings 17. The conductor 8 is also attached to the electrode rods, preferably by welding. The rods 16 are spaced from each other a sufficient amount to provide openings through which the liquid hot salt may freely flow into the interior of the electrode.

These hollow electrodes not only present a greater surface area to the salt bath, but they are much lighter in weight than a solid bar and thus impose less stress on the electrode supports. This is an important factor where long electrodes are used in deep pots. Furthermore, since the electrodes are hollow and the salt bath may freely flow through the interior of the electrodes, this free flow of the bath acts as a cooling medium that prevents excessive heating of the electrodes.

These electrodes may be made from low carbon steel for low temperature operations, or alloy steels, such as 28% chrome-iron .15 carbon, pure nickel, "inconel," or other materials, in common use for salt bath electrodes. The present invention is not concerned with the material of the electrodes, but is directed to the shape and form of the electrodes.

The electrodes will also operate satisfactorily where the upper end 11 is above the surface of the salt bath but the preferred operation is that wherein the upper end is submerged as is illustrated in Fig. 2.

While the present invention is disclosed with the use of three electrodes, which would be the set-up ordinarily used with a three-phase current, it is to be understood that the number of electrodes used is to be in accordance with the practices in the art wherein various numbers of electrodes are used with various kinds of electrical current.

What I claim is:

1. An electrode for a fused salt bath electrical furnace comprising a hollow tubular conductor of electricity having openings in the side wall thereof adapted to be submerged vertically in a salt bath, the said side wall being thin at one end and thick at the other end of said electrode 2. An electrode for a fused salt bath furnace for heat treatment of metal parts, comprising a hollow tubular conductor of electricity, the side walls of said conductors being thicker in cross-section at the top than at the bottom.

3. An electrode for a fused salt bath furnace for heat treatment of metal parts, comprising a hollow tubular conductor of electricity adapted to extend verically in a salt bath, the side walls of said conductor being thicker in cross-section at the top than at the bottom, and the bottom portion of said electrode having a greater surface area than the top portion.

4. An electrode for a fused salt bath furnace for heat treatment of metal parts, comprising a hollow tubular conductor of electricity of circular cross-section, the side walls of said conductor being thicker in cross section at the top than at the bottom.

5. An electrode for a fused salt bath furnace for heat treatment of metal parts, comprising a hollow tubular conductor of electricity of frusto-conical shape adapted to extend vertically in a salt bath, the side walls of said conductor being thicker in cross-section at the top than at the btttom, and the bottom portion of said electrode having a greater surface area than the top portion.

ARTEMAS F. HOLDEN.

REFERENCES CITED

The following references are of record in the file of this patent:

UNITED STATES PATENTS

| Number | Name | Date |
| --- | --- | --- |
| 2,050,607 | Hallman | Aug. 11, 1936 |
| 2,215,317 | Brieger | Sept. 17, 1940 |
| 2,223,139 | Upton | Nov. 26, 1940 |
| 2,336,412 | Messinger | Dec. 7, 1943 |
| 614,930 | Burton | Nov. 29, 1898 |
| 696,004 | Burton | Mar. 25, 1902 |
| 920,473 | Johnson | May 4, 1909 |
| 1,484,243 | Von Brockdorff | Feb. 19, 1924 |
| 1,527,762 | Unland | Feb. 24, 1925 |
| 2,152,157 | Sittler et al. | Mar. 28, 1939 |
| 2,158,692 | Duberstein et al. | May 16, 1939 |
| 2,263,549 | Peyches | Nov. 18, 1941 |
| 2,304,016 | Peyches | Dec. 1, 1942 |
| 1,328,069 | Young | Jan. 13, 1920 |

FOREIGN PATENTS

| Number | Country | Date |
| --- | --- | --- |
| 349,830 | British | June 4, 1931 |
| 422,868 | British | Jan. 21, 1935 |